(12) United States Patent
Kim et al.

(10) Patent No.: US 11,565,262 B2
(45) Date of Patent: Jan. 31, 2023

(54) CONTINOUS BAND-PASS FILTER SIZE SEPARATION USING A NEGATIVE ANGLE DLD ARRAY

(71) Applicant: INTERNATIONAL BUSINESS MACHINES CORPORATION, Armonk, NY (US)

(72) Inventors: Sung-Cheol Kim, New York, NY (US); Stacey Gifford, Ridgefield, CT (US); Benjamin Hardy Wunsch, Mt. Kisco, NY (US); Joshua T. Smith, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 417 days.

(21) Appl. No.: 16/814,947

(22) Filed: Mar. 10, 2020

(65) Prior Publication Data
US 2021/0283611 A1 Sep. 16, 2021

(51) Int. Cl.
*B01L 3/00* (2006.01)
*G01N 15/10* (2006.01)

(52) U.S. Cl.
CPC ... *B01L 3/502776* (2013.01); *B01L 3/502753* (2013.01); *G01N 15/1056* (2013.01); *B01L 2200/0636* (2013.01); *B01L 2200/0652* (2013.01); *B01L 2300/047* (2013.01); *B01L 2300/06* (2013.01); *B01L 2300/0858* (2013.01); *G01N 2015/1087* (2013.01); *G01N 2015/1093* (2013.01)

(58) Field of Classification Search
CPC ......... B01L 3/502776; B01L 3/502753; B01L 2200/0636; B01L 2200/0652; B01L 2300/047; B01L 2300/06; B01L 2300/0858; B01L 2300/0816; B01L 2300/0864; B01L 2400/0487; B01L 2400/086; G01N 15/1056; G01N 2015/1087; G01N 2015/1093; G01N 2015/1081; G01N 15/10
USPC ........................................................ 209/156
See application file for complete search history.

(56) References Cited

U.S. PATENT DOCUMENTS 7,735,652 B2 * 6/2010 Inglis ................ B01L 3/502753
210/433.1
8,282,799 B2 10/2012 Huang et al.
(Continued)

OTHER PUBLICATIONS

"Multidirectional sorting modes in deterministic lateral displacement devices, 2018" (Year: 2008).*
(Continued)

*Primary Examiner* — Gene O Crawford
*Assistant Examiner* — Muhammad Awais
(74) *Attorney, Agent, or Firm* — Intelletek Law Group, PLLC; Gabriel Daniel, Esq.

(57) ABSTRACT

A microfluidic device comprising a channel within a substrate and a condenser or a hydrodynamic focusing chamber along the channel, configured to focus a fluid containing particles of a plurality of sizes. A negative angle deterministic lateral displacement (DLD) array is configured to receive the focused fluid and separate the particles in the focused fluid into three sizes ranges. The negative angle DLD array comprises a plurality of rows of pillars, wherein the rows of pillars are positioned to repeat a pattern every N rows with a shift of M columns, N and M are relatively coprime, and N is greater than 1.

20 Claims, 15 Drawing Sheets

(56) References Cited

U.S. PATENT DOCUMENTS

| | | | |
|---|---|---|---|
| 8,579,117 B2* | 11/2013 | Loutherback | G01N 30/0005 |
| | | | 209/208 |
| 9,835,539 B2 | 12/2017 | Astier et al. | |
| 10,010,883 B2* | 7/2018 | Hu | B01L 3/502746 |
| 10,058,895 B2 | 8/2018 | Astier et al. | |
| 2007/0026415 A1* | 2/2007 | Fuchs | B82Y 5/00 |
| | | | 435/6.16 |
| 2007/0059718 A1* | 3/2007 | Toner | C12Q 1/24 |
| | | | 435/6.12 |
| 2012/0037544 A1 | 2/2012 | Lane et al. | |
| 2014/0342375 A1* | 11/2014 | Grisham | B01L 3/502753 |
| | | | 435/30 |
| 2019/0224677 A1* | 7/2019 | Smith | B01L 3/502753 |
| 2019/0318505 A1 | 10/2019 | LaSalle et al. | |

OTHER PUBLICATIONS

"Multidirectional sorting modes in deterministic lateral displacement devices, 2008" (Year: 2008).*

Inglis, D. W. et al., "Critical Particle Size for Fractionation by Deterministic Lateral Displacement"; The Royal Society of Chemistry, Lab Chip (2006); vol. 6; pp. 655-658.

Kim, S. et al., "Broken Flow Symmetry Explains the Dynamics of Small Particles in Deterministic Lateral Displacement Arrays"; Proceedings of the National Academy of Sciences (2017); vol. 114:26, pp. E5034-E5041.

Long, B. R. et al., "Multidirectional Aorting Modes in Seterministic Lateral Displacement Devices"; Physical Review (2008); vol. E 78:046304; 10 pgs.

Smith, J. T. et al., "Integrated Nanoscale Deterministic Lateral Displacement Arrays for Separation of Extracellular Vesicles From Clinically-Relevant Volumes of Biological Samples"; The Royal Society of Chemistry, Lab Chip (2018); vol. 18, pp. 3913-3925.

Wunsch, B. H. et al., "Gel-on-a-chip: Continuous, Velocity-Dependent DNA Separation Using Nanoscale Lateral Displacement"; The Royal Society of Chemistry, Lab Chip (2019); vol. 19, pp. 1567-1578.

Wunsch, B. H. et al., "Nanoscale Lateral Displacement Arrays for the Separation of Exosomes and Colloids Down to 20 nm"; Nature Nanotechnology (2016); vol. 11; pp. 936-942.

* cited by examiner

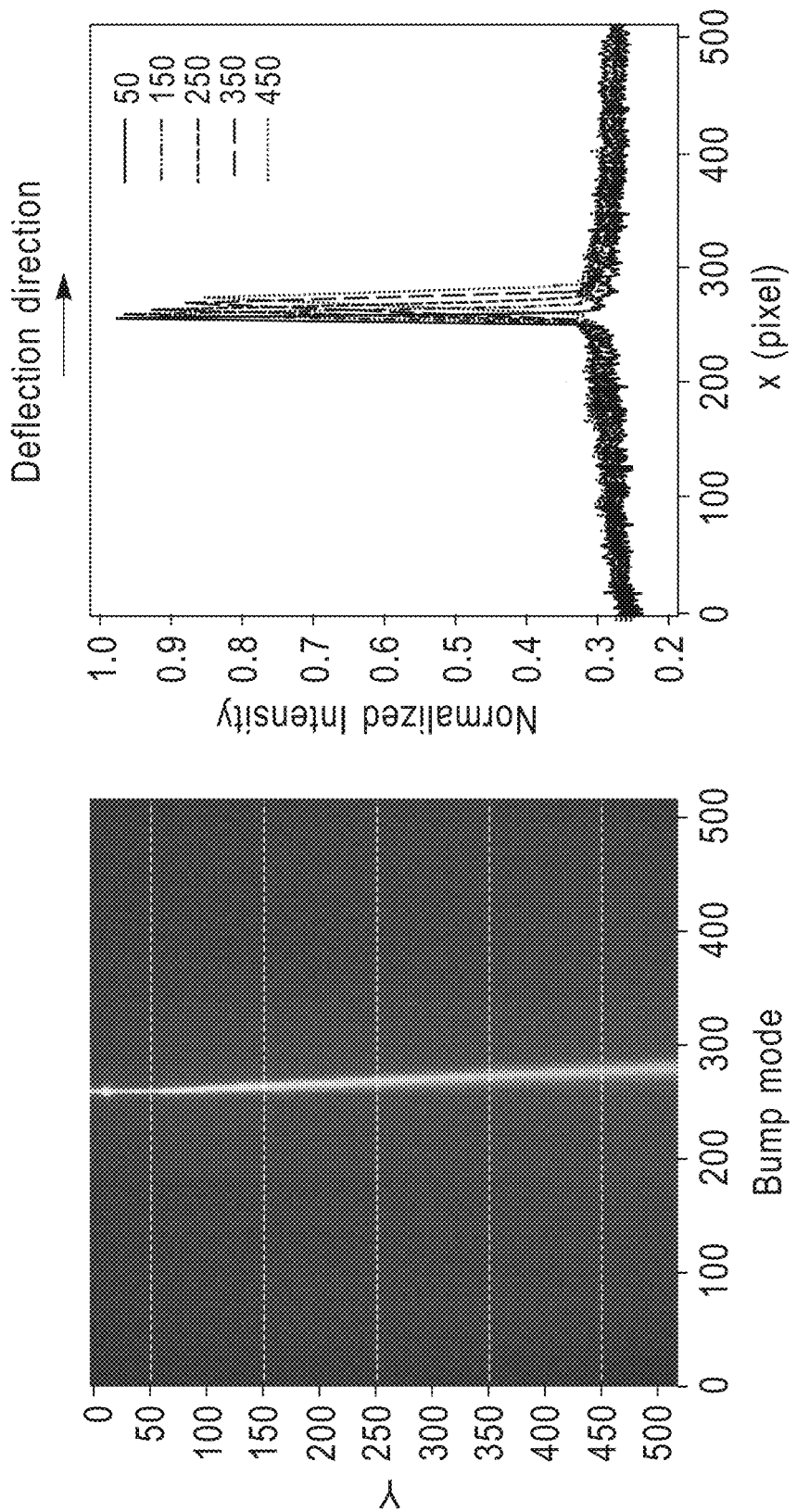

CONTINOUS BAND-PASS FILTER SIZE SEPARATION USING A NEGATIVE ANGLE DLD ARRAY

TECHNICAL FIELD

Embodiments of the disclosure relate to microfluidic devices and methods for particle separation. More particularly, embodiments of the disclosure relate to the use of a negative deterministic lateral array in a microfluidic device to separate particles into three or more ranges of particle sizes.

DESCRIPTION OF THE RELATED ART

The ability to purify particles, such as colloids, is salient for practical applications and analysis of nanomaterials. This is particularly salient in biology and medicine, where biocolloids ranging from proteins, vesicles and organelles, constitute the molecular building blocks of all living things. For example, exosomes are nanometer-sized extracellular vesicles (EVs) ranging in size from 30-150 nanometers (nm), which are regularly shed from cells and have emerged as a promising source of biomarkers (e.g. tumor-specific proteins, micro-ribonucleic acid ("microRNA"), messenger RNA ("mRNA"), and deoxyribonucleic acid ("DNA")) for diseases, such as cancer, with broad application in diagnosis, treatment monitoring, and/or therapeutics. Part of the attraction to these EVs is that they can be extracted for analysis from minimally or non-invasive liquid biopsies (e.g., blood, plasma, and/or urine samples), and can thereby reduce the need for tissue biopsies to obtain diagnostic information.

Much of nanotechnology and biotechnology has been concerned with purification techniques, including gel electrophoresis, chromatography, centrifugation, affinity binding and molecular sieving. Another emerging separation technique are lab-on-a-chip and/or microfluidic technologies, which can purify small quantities of sample rapidly and precisely on chip. New technologies, based on periodic nanostructures or "metamaterials" have proven effective for on-chip purification systems, one example being microscale and nanoscale deterministic lateral displacement ("DLD"), which uses asymmetric mesoscale pillar arrays to laterally displace jets of colloid mixtures into size-sorted streams. A variation on this method, termed nanoscale condenser arrays ("nCA"), produces lateral splitting of colloid mixtures in a flowing stream using manipulation of the fluid flow itself, producing a nearly size-agnostic method of displacing particles.

SUMMARY

A microfluidic device comprising a channel within a substrate and a condenser along the channel is disclosed. The condenser is configured to focus a fluid containing particles of a plurality of sizes. A negative angle deterministic lateral displacement (DLD) array is configured to receive the focused fluid and separate the particles in the focused fluid into three sizes ranges. The negative angle DLD array comprises a plurality of rows of pillars, wherein the rows of pillars are positioned to repeat a pattern every N rows with a shift of M columns, where N and M are relatively coprime, and N is greater than 1.

Instead of the condenser, hydrodynamic focusing may be provided to focus the fluid. An additional condenser may also be provided downstream of the negative angle DLD array to facilitate collection of a particular size range of particles.

DETAILED DESCRIPTION

The drawings are of illustrative embodiments. They do not illustrate all embodiments. Other embodiments may be used in addition or instead. Details that may be unnecessary may be omitted to save space or for more effective illustration. Some embodiments may be practiced with additional components or steps and/or without all components that are illustrated. When the same numeral appears in different drawings, it refers to the same or like components or steps.

Figure 3A:
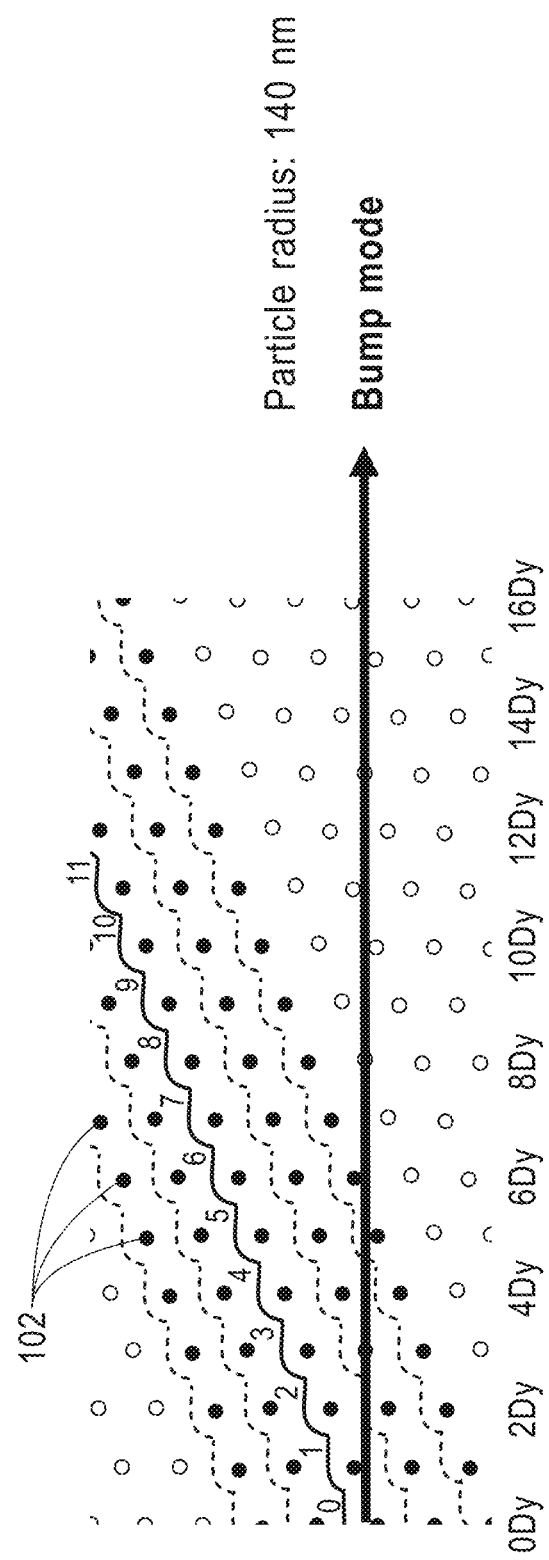
Figure 3B:
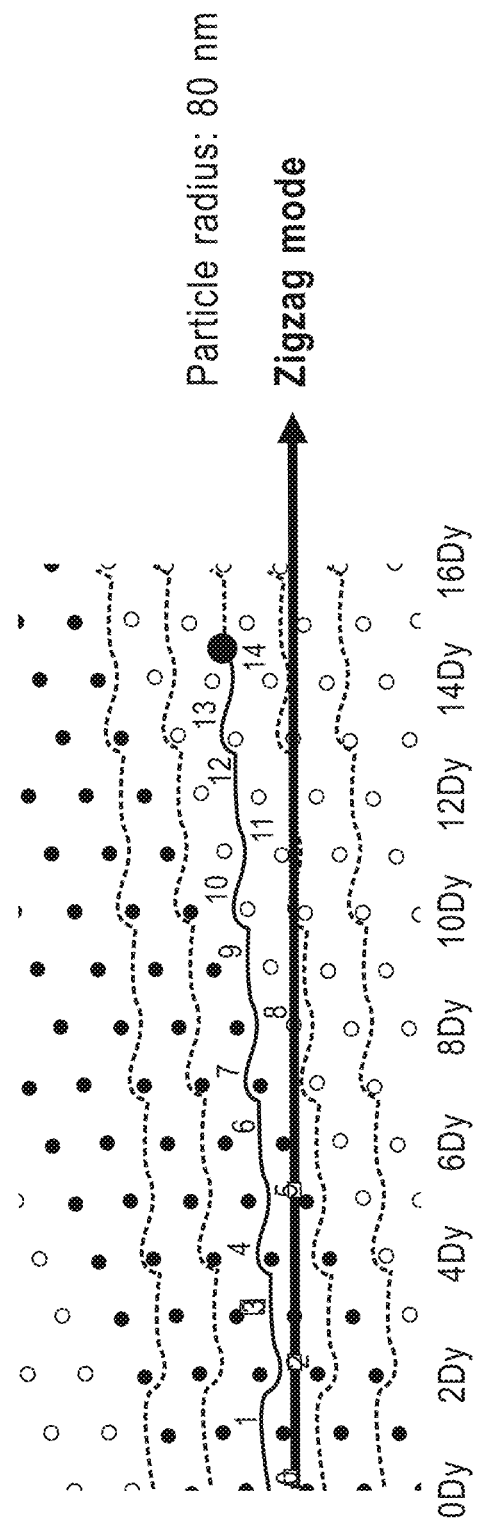
Figure 3C:
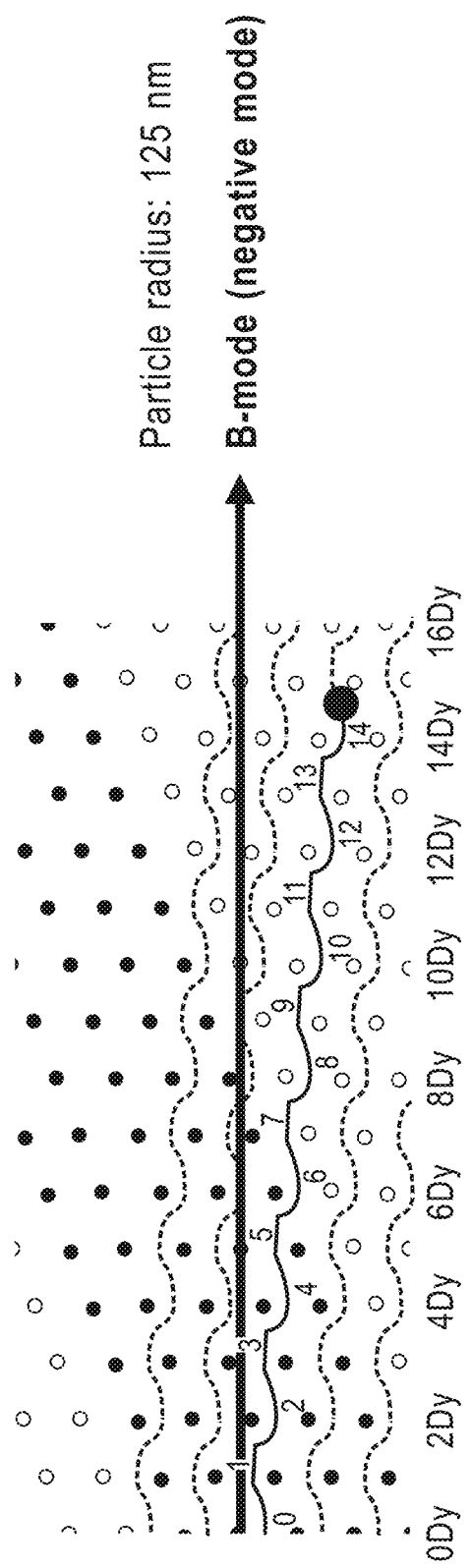

FIG. 3A, FIG. 3B, and FIG. 3C show calculated particle paths for three different particles having three different radii through a negative angle DLD pillar array.

Figure 4:
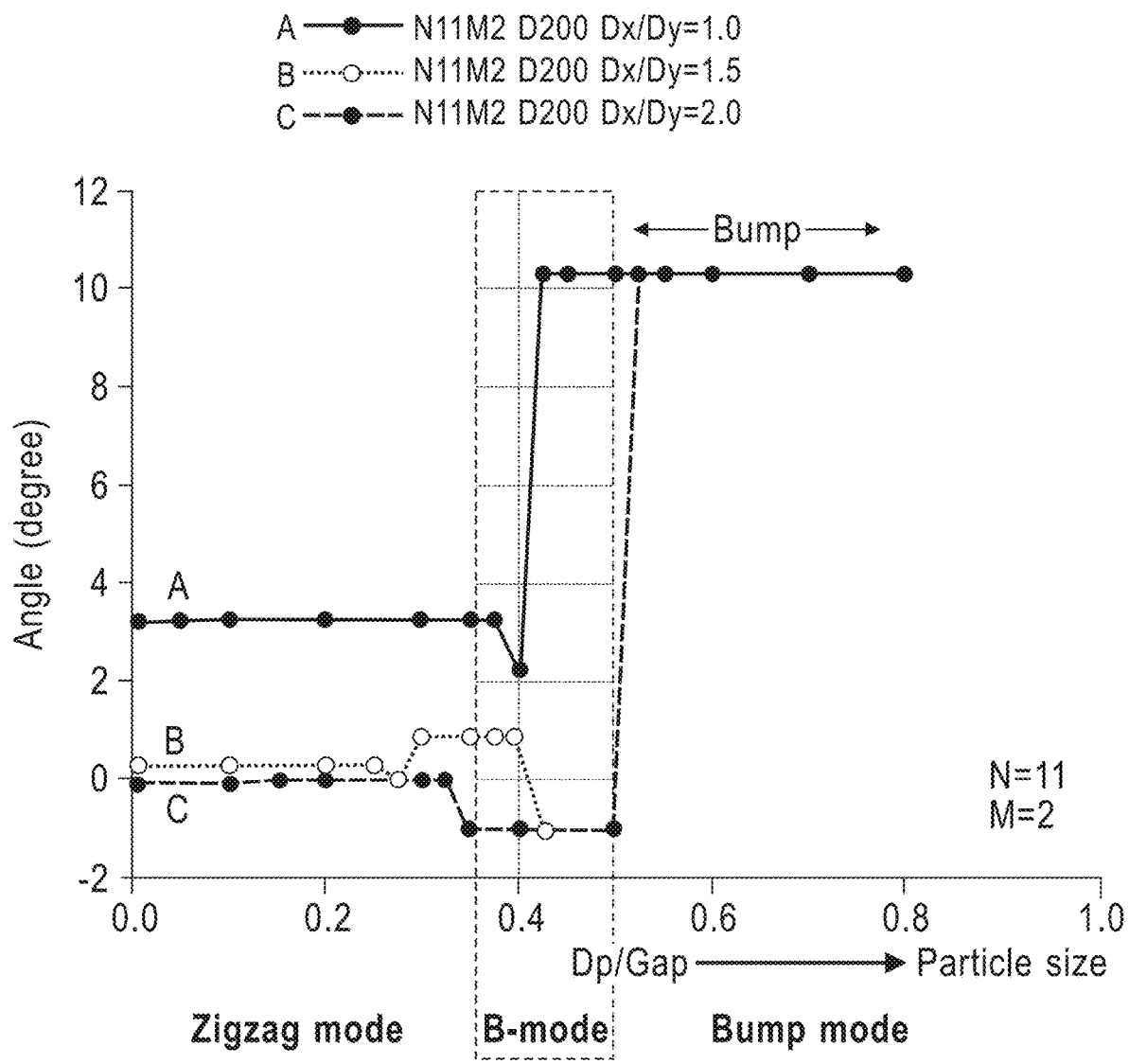

FIG. 4 is a map showing the relationship between the particle size and corresponding migration angle based on the variables N, M, and the $D_x/D_y$ ratio.

Figures 5A, 5B:
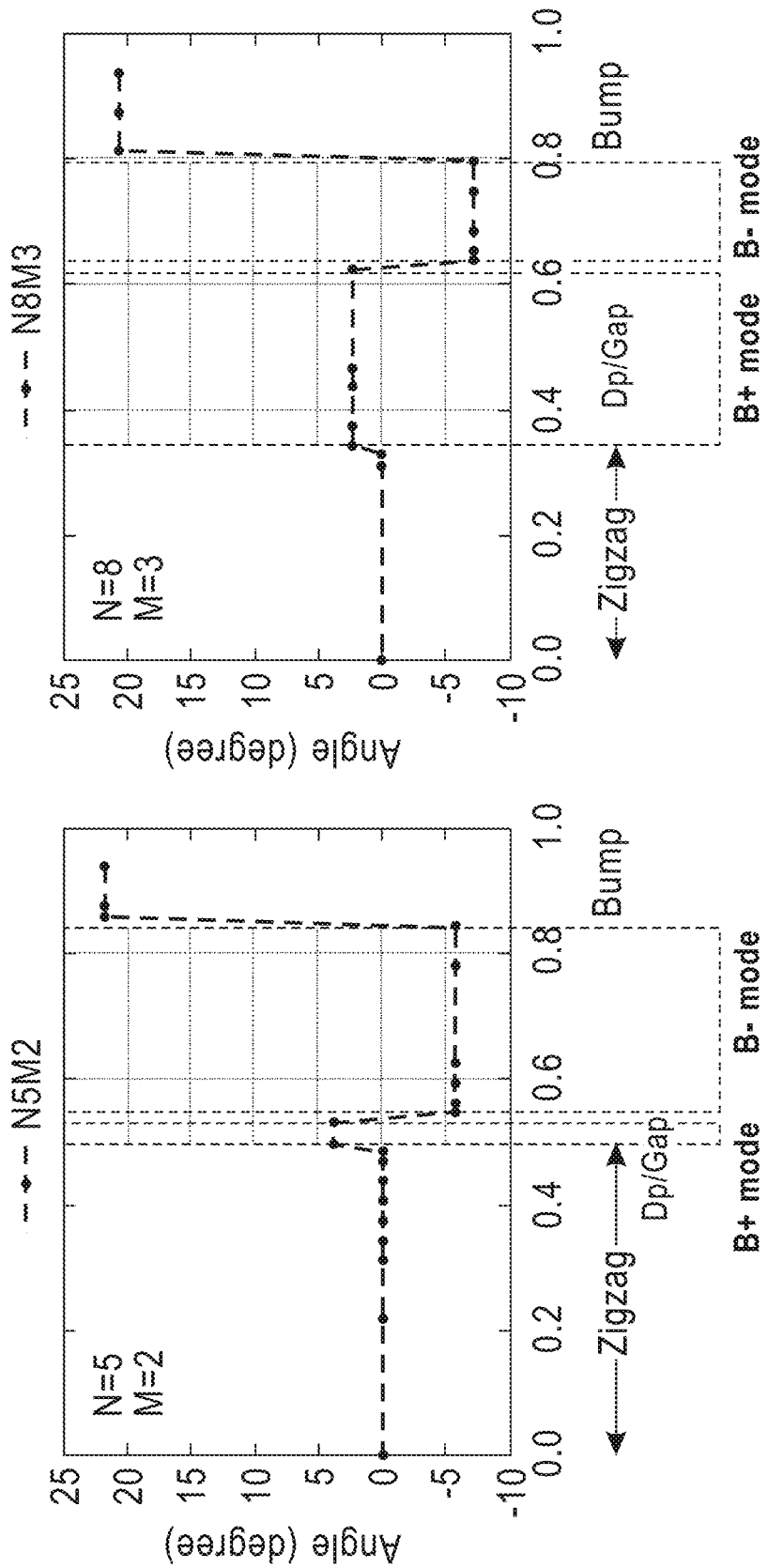

FIG. 5A is a map showing migration modes where N=5 and M=2.

FIG. 5B is a map showing migration modes where N=8 and M=3.

Figure 6:
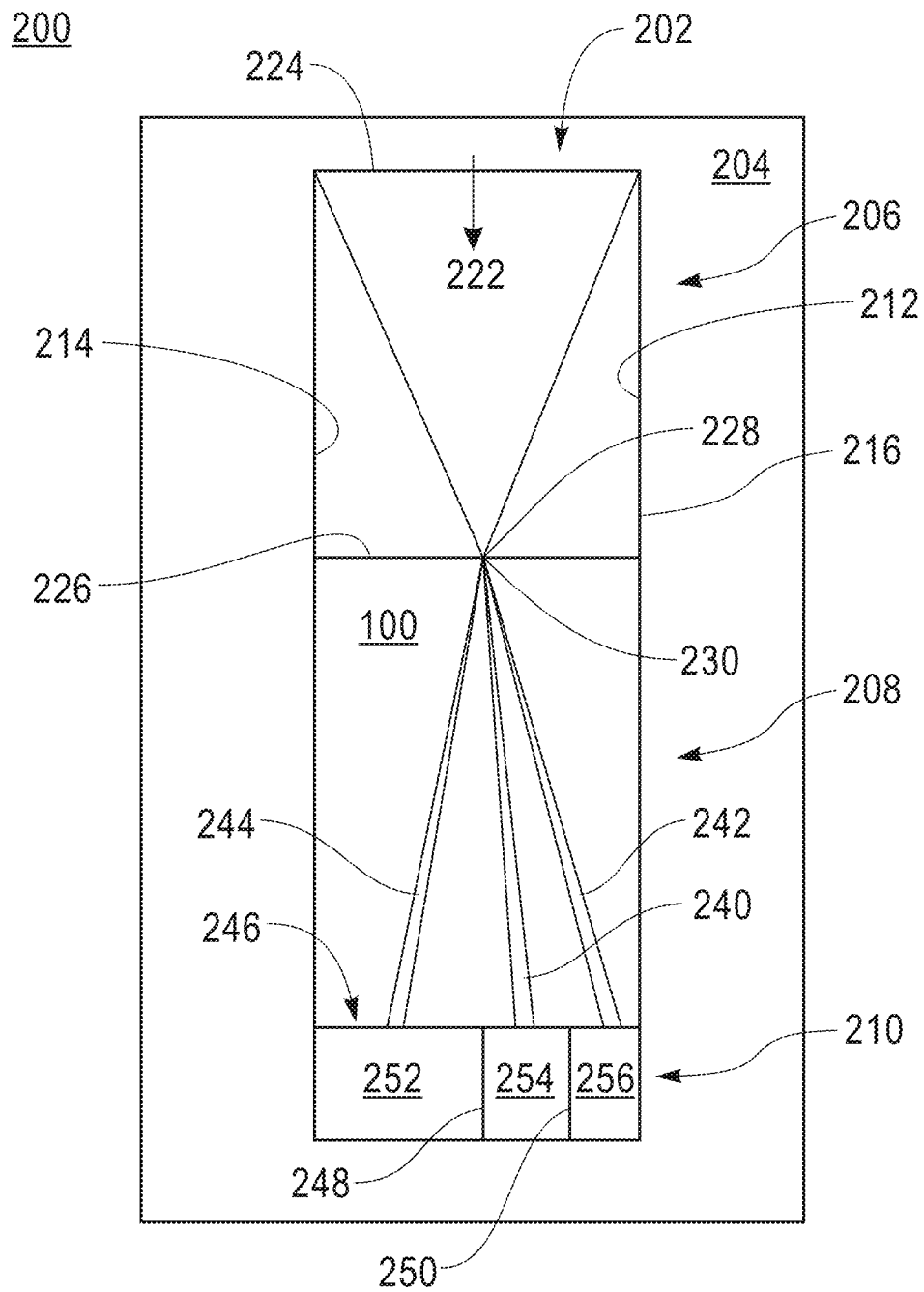

FIG. 6 is a top view of an example of a microfluidic device including a negative angle DLD array for particle separation, in accordance with an embodiment of the disclosure.

Figure 7:
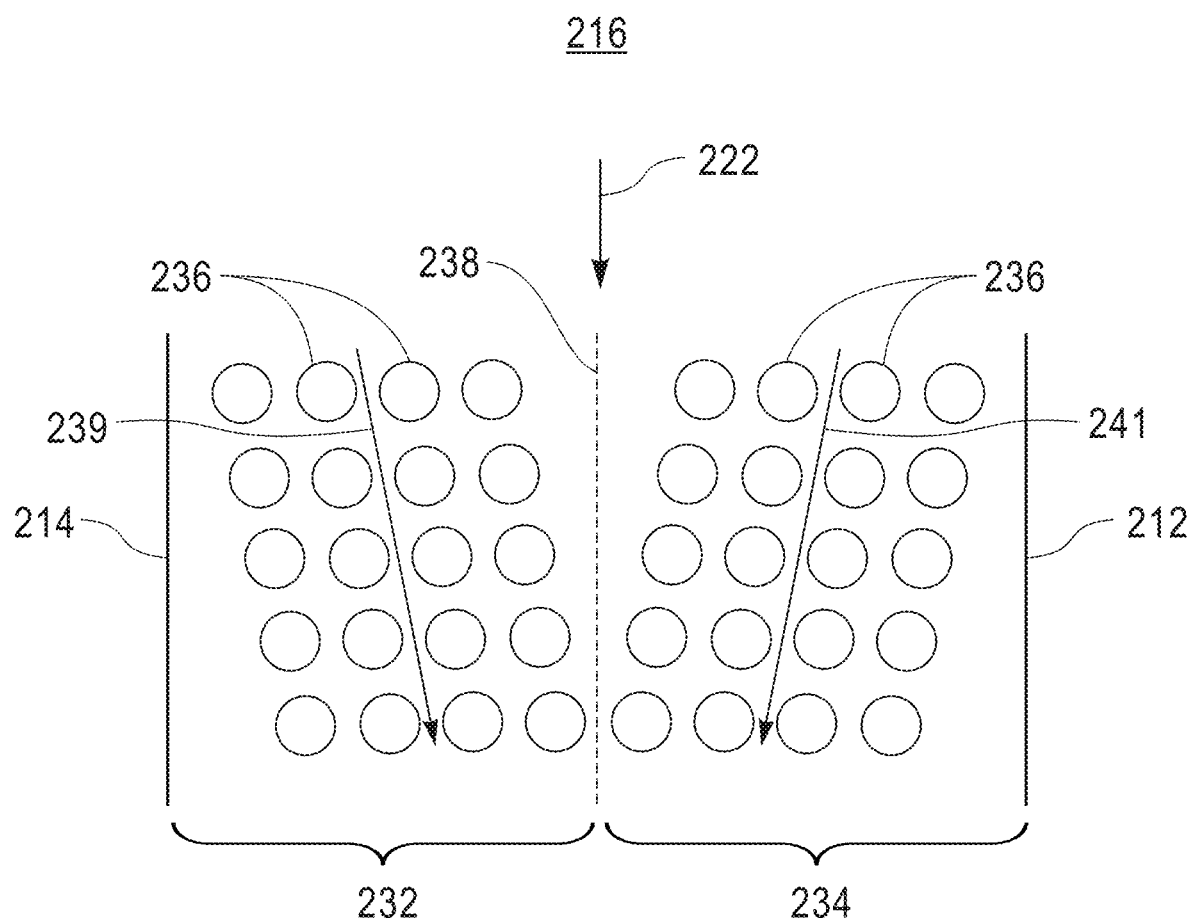

FIG. 7 is a view of a portion of an example of a condenser used in the microfluidic device of FIG. 6.

Figures 8A, 8B:
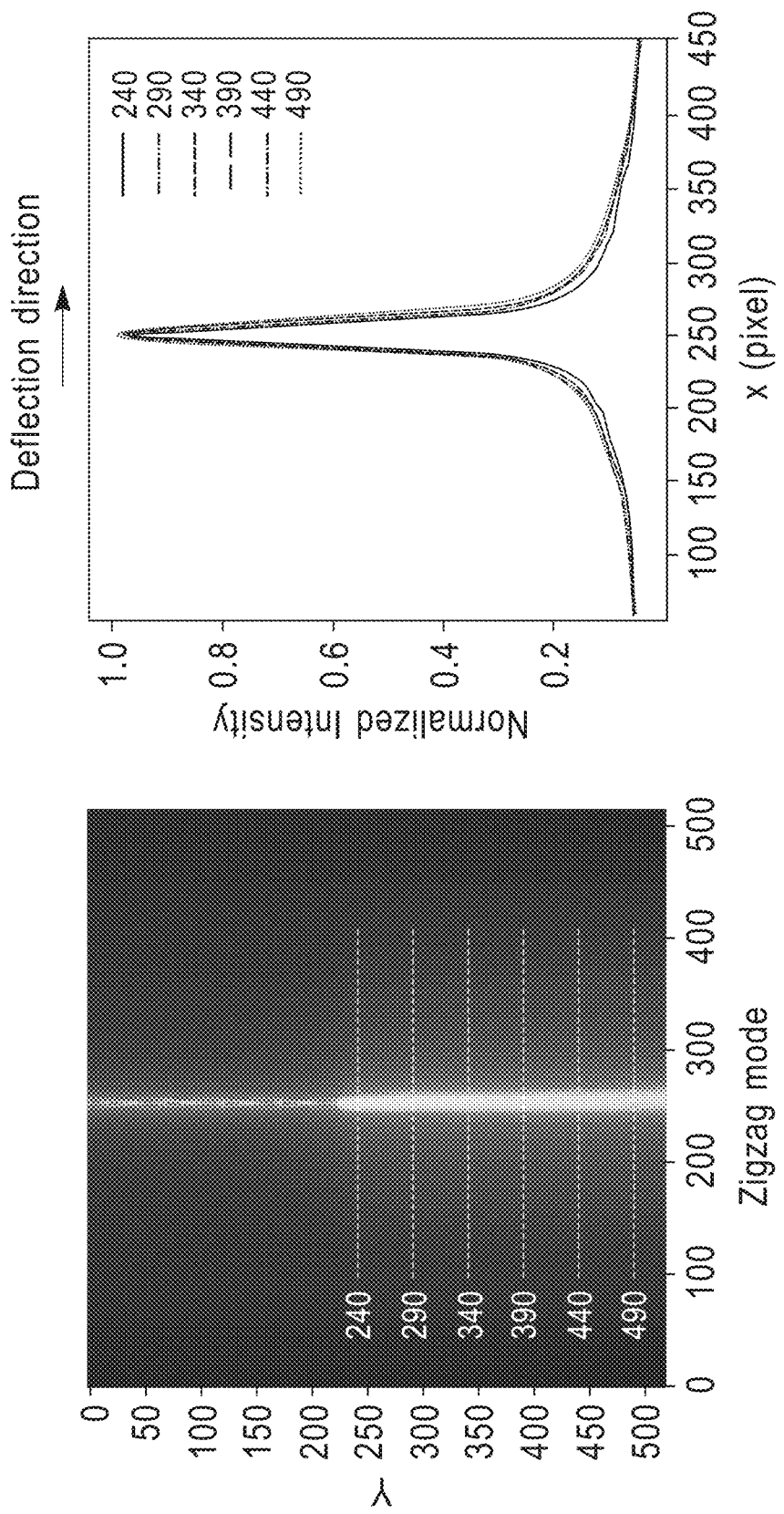

FIG. 8A is a fluorescence microscopy image of 50 nm particles entering the negative DLD array from the condenser, in the microfluidic device of FIG. 6.

FIG. 8B shows intensity line profiles plotted at different locations along the streamlines in FIG. 8A.

FIG. 9A is a fluorescence microscopy image showing the deflection of the beam of particles toward the left.

FIG. 9B shows intensity line profiles plotted at different locations along the streamlines in FIG. 9A.

Figures 10A, 10B:
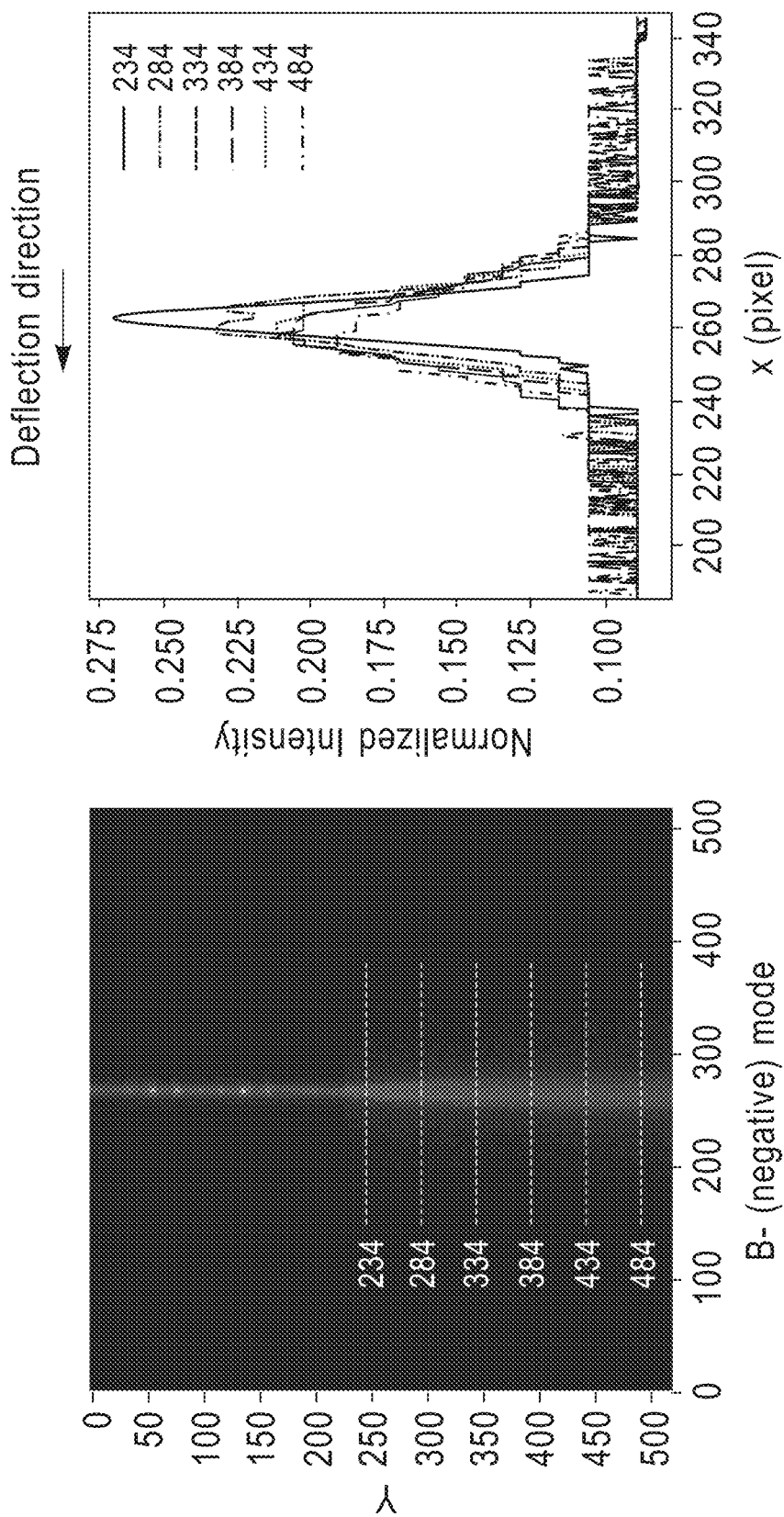

FIG. 10A shows the beam trajectory of particles having a particle size of 110 nm in the bump mode.

FIG. 10B shows intensity line profiles at different locations along the streamlines in FIG. 10A.

Figure 11:
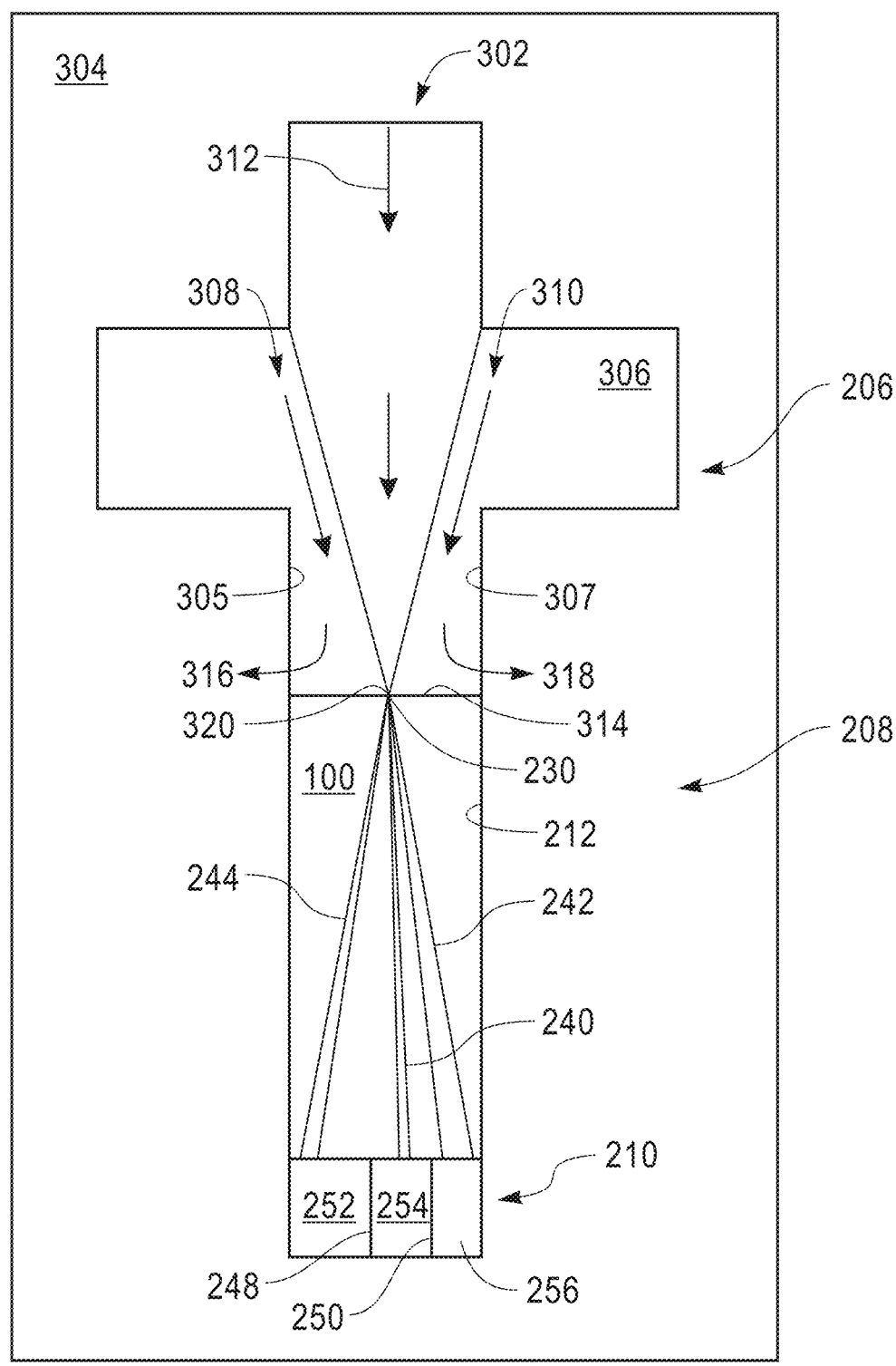

FIG. 11 is a top view of another example of a microfluidic device for particle separation that uses hydrodynamic focusing, in accordance with an embodiment of the disclosure.

Figure 12:
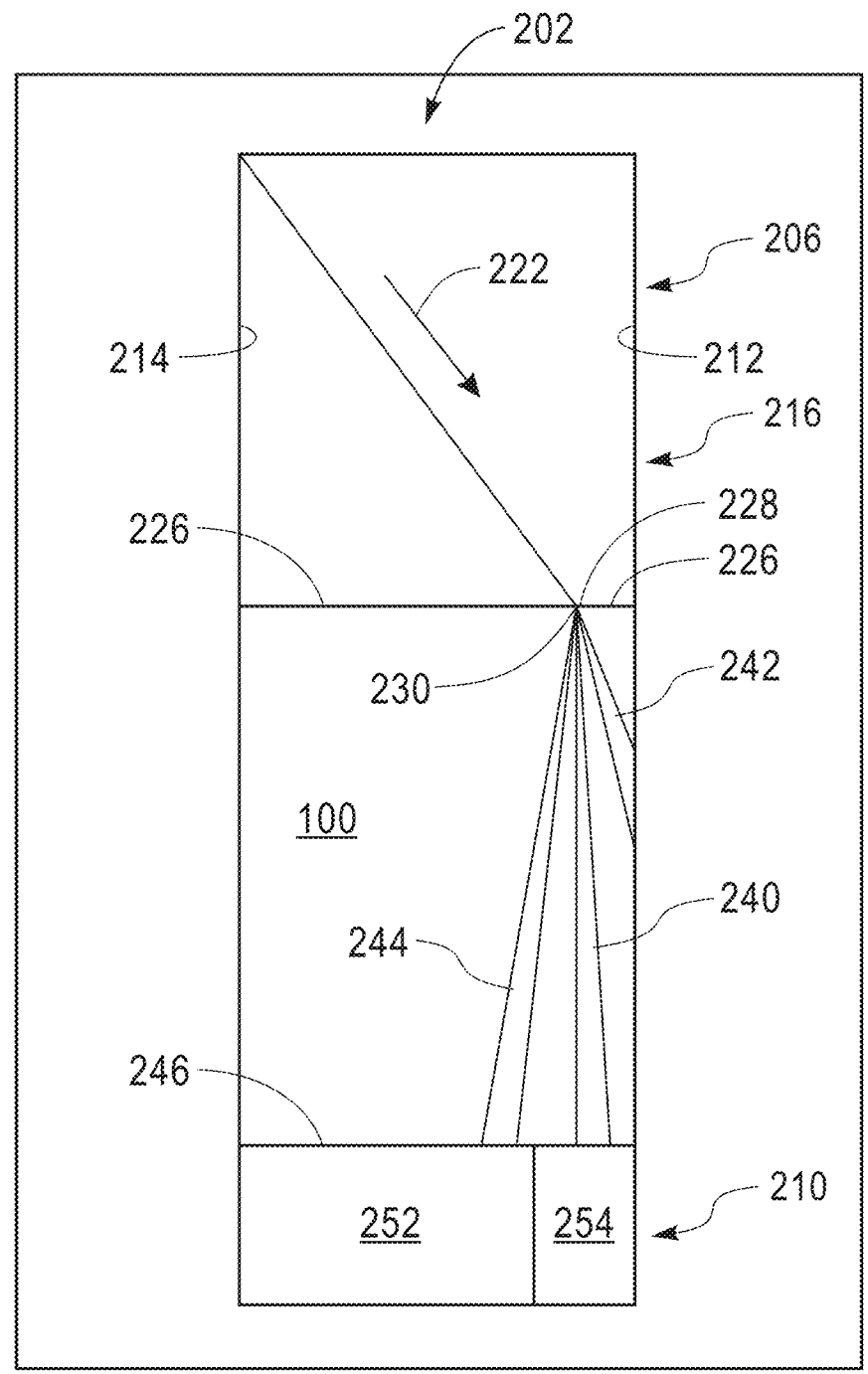

FIG. 12 is a top view of another example of a microfluidic device for particle separation in accordance with an embodiment of the disclosure.

Figure 13:
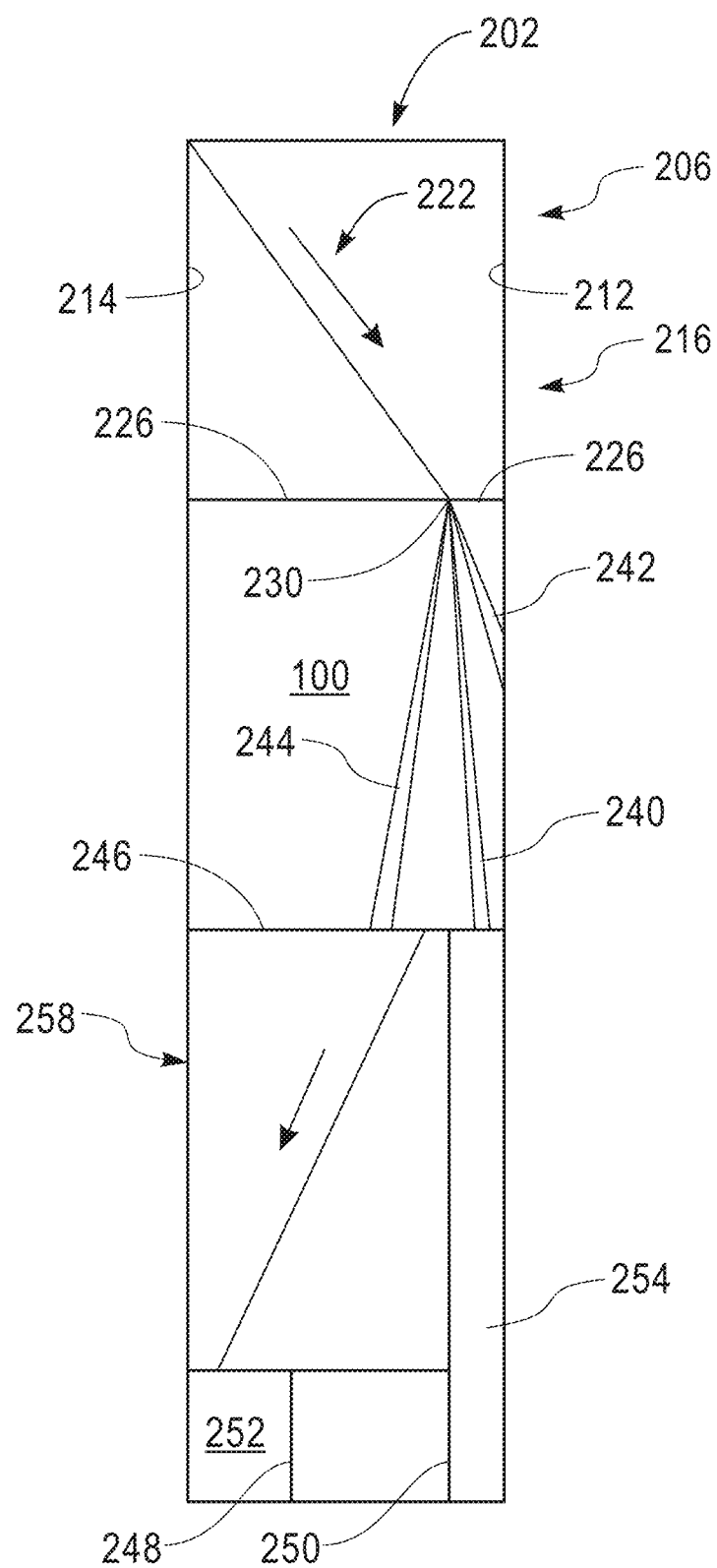

FIG. 13 is a top view of another example of a microfluidic device for particle separation, in accordance with an embodiment of the disclosure.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. In the following detailed description, numerous specific details are set forth by way of examples to provide a thorough understanding of the relevant teachings. However, it should be apparent that the present teachings may be practiced without such details. In other instances, well-known methods, procedures, and components have been described at a relatively high-level, without detail, to avoid unnecessarily obscuring aspects of the present teachings.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The original DLD theory teaches that a particle moves through a DLD array along the pressure gradient direction in one of two modes. The pressure gradient determines the flow direction. A particle with a radius less than $G^{0.4}$, where G is the gap between pillars, moves along the pressure gradient direction in what is referred to as a zigzag mode that tracks the motion of the surrounding fluid with a small angle of deflection or no angle of deflection. A particle with a size more than $G^{0.4}$ migrates in a deflected angle where particles bump into pillars, altering their direction along a pillar array shift angle in what is referred to as a bump mode. The zigzag mode is closer to the direction of the fluid flow through the array than the bump mode. Theoretically, a particle has only these two modes when there is no Brownian motion, which makes a DLD device a binary sorter.

In accordance with embodiments of the disclosure, a negative angle DLD array is used to achieve particle bandpass selection of three or more particle ranges in microfluidic devices without the need for multiple stages of DLD arrays and with reduced diffusion. In another embodiment, the negative DLD structure is also be used with a conventional DLD and condenser structure so that various sizes of particles can be efficiently separated. The negative angle DLD array may be a nanoDLD array.

Figure 1B:
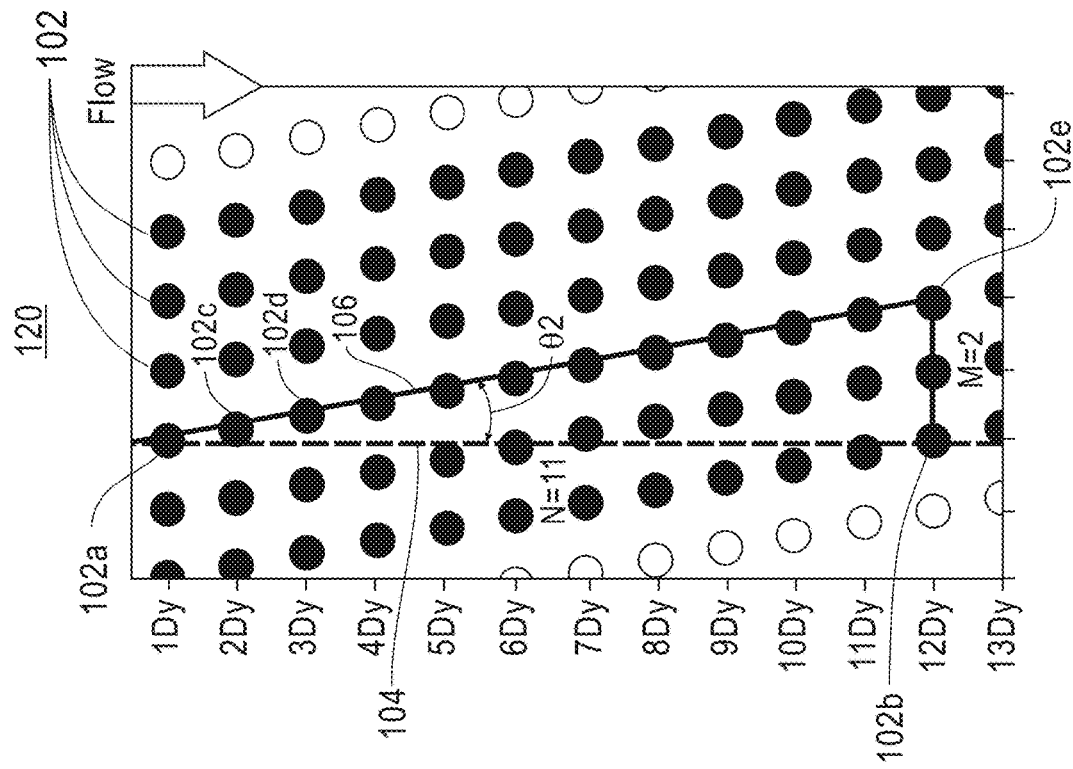
FIG. 1B is a top view of a schematic representation of a portion of another example of a negative angle DLD pillar array, in accordance with an embodiment of the disclosure.
Figure 1A:
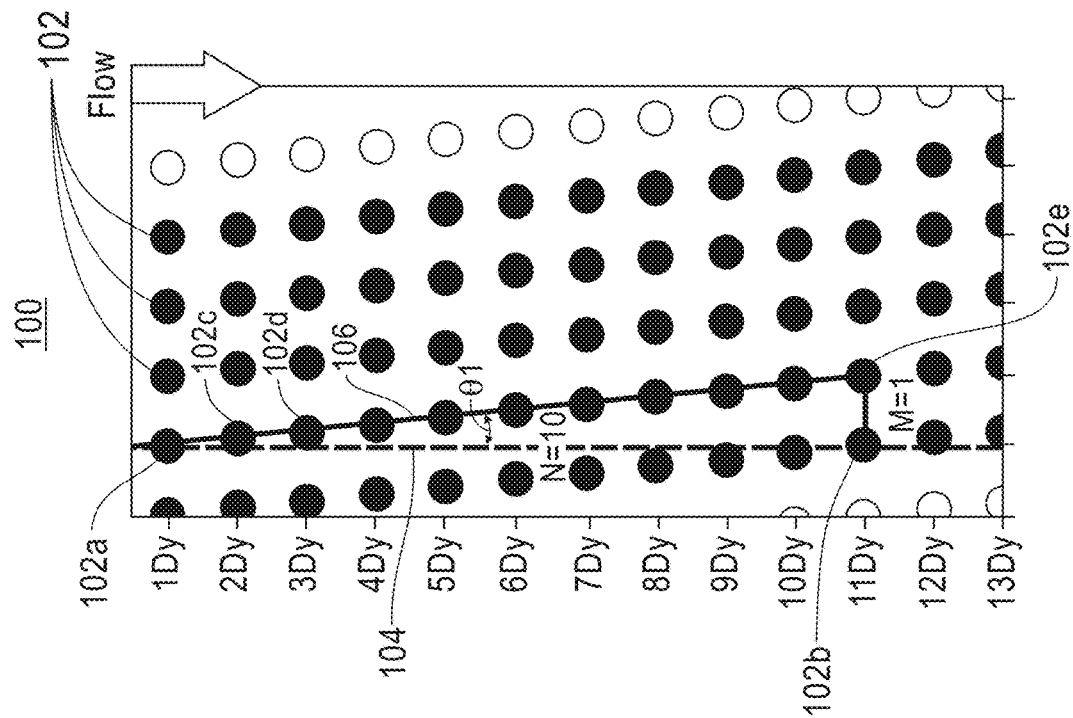
FIG. 1A is a top view of a schematic representation of a portion of an example of a negative angle DLD pillar array, in accordance with an embodiment of the disclosure.

FIG. 1A is a top view of a schematic representation of a portion of an example of a negative angle DLD pillar array (or "DLD array") 100 comprising a plurality of pillars 102 for use in a microfluidic particle separation device, in accordance with an embodiment of the disclosure. A vertical arrow indicated by "Flow" shows the direction of fluid flow from the top of the DLD array 100 to the bottom of the array in FIG. 1A, during particle separation. In this example, the pillars 102 are arranged in horizontal, parallel rows 1Dy-13Dy . . . . The distance between pillars 102 in each row is constant and the distance between rows is constant. Pillars 102 in one row are laterally offset to the right with respect to the pillars in the previous row such that pillars are aligned every Nth row. A vertical line 104 is drawn from a center of the pillar 102a to determine the next pillar 102 that is vertically aligned with the pillar 102a, in the direction of fluid flow. In this example, the vertical line 104 passes through the center of the pillar 102b in row 11Dy, which is 10 rows from the pillar 102a. There will therefore be a pillar 102 aligned with the vertical line 104 every 10 rows. The DLD array 100 therefore has a pillar periodicity N=10.

A second line 106 is drawn through adjacent pillars 102c and 102d, etc. In row 11Dy the line 106 passes through the center of a pillar 102e, which is offset one (1) column from the pillar 102b. The DLD array 100 in this example therefore has a row shift M=1. In the DLD array 100 of FIG. 1A, M and N are relatively coprime, and N is greater than 1.

The vertical line 104 and the line 106 form an angle $\Theta 1$ that is referred to as a shift angle of the pillar array. The shift angle is equal to arctan (1/10).

Where the pillar position repeats itself every Nth row with M shifts, a row-shift fraction is defined as y=M/N. In FIG. 1A the row-shift fraction is 1/10. In FIG. 1A, the distance of the lateral shift of pillar position from one row to the next, also referred to as the row-shift distance, is $1/10*D_y$, where $D_y$ is the pitch distance between adjacent pillars same row Dy. This is illustrated in FIG. 2, below.

FIG. 1B is an example of another negative angle DLD pillar array 120. Elements common to FIG. 1A are commonly numbered. As shown in FIG. 1B, the pillar positions repeat every 11 rows with an offset of 2. Therefore, N=11 and M=2, which are relatively coprime, and N is greater than 1. The row shift portion or periodicity of N/M=11/2=5.5 and the row-shift fraction of M/N=2/5=0.4. The shift angle $\Theta 2$ in FIG. 1B is arctan 11/5.

As discussed above, the original DLD theory explains particle modes and the criteria of separation only when the pillar structure has integer frequency and could not be applied to the DLD array 120 of FIG. 1B. Applicants have identified that separation devices including negative angle DLD arrays, where N and M are relatively coprime and N is greater than 1, as in FIGS. 1A and 1n FIG. 1B, can be used to separated collect particles into three or more size ranges, or in a size range between a larger and a smaller size range.

Figure 2:
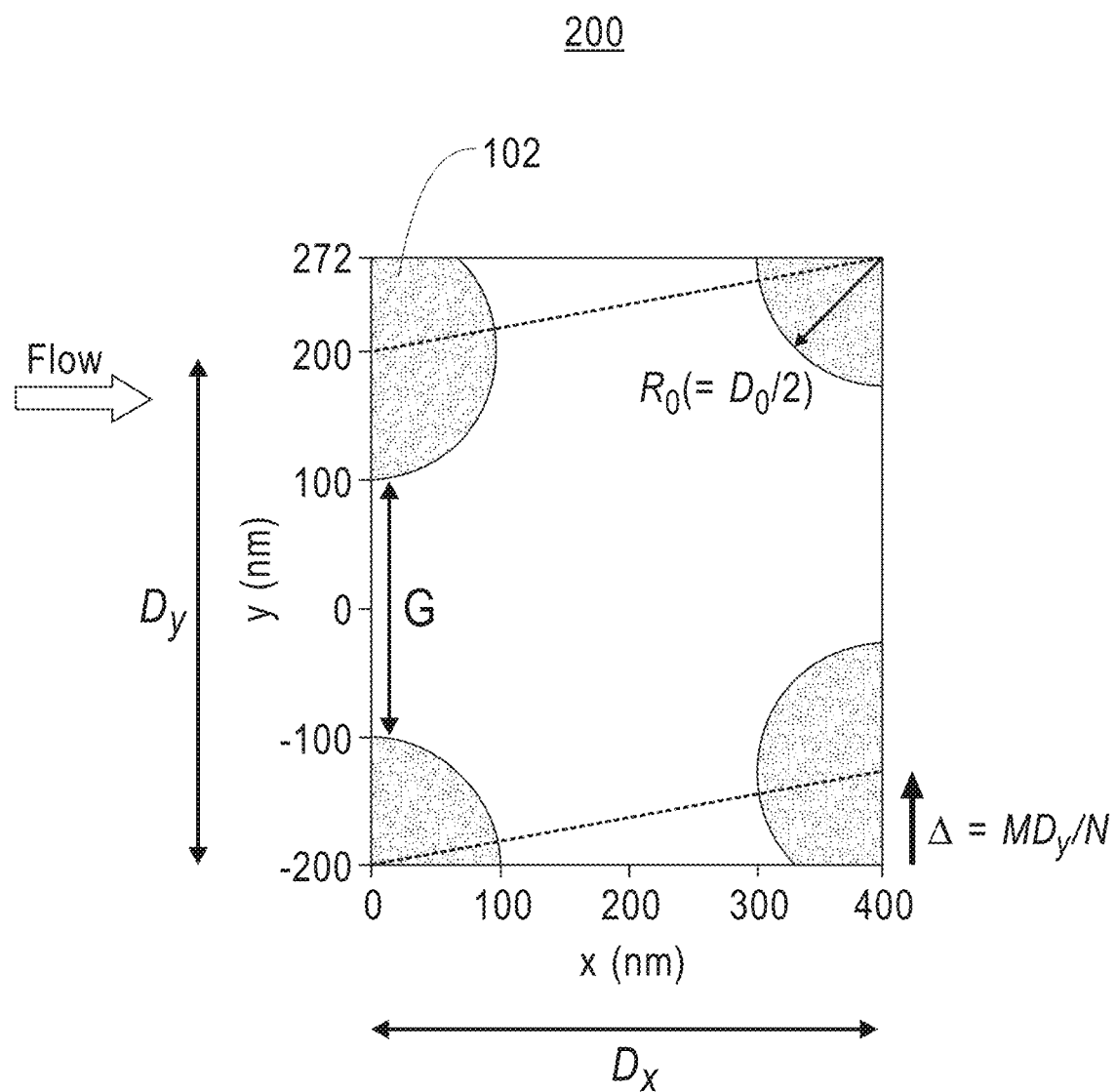
FIG. 2 is a unit cell of the negative angle DLD pillar array, identifying parameters of the array.

FIG. 2 shows an enlarged view of a unit cell 130 of a negative angle DLD pillar array 100, as in FIG. 1A. The direction of fluid flow in FIG. 2 is from left to right, along the x-axis. The pillar radius ($R_0$), the pitch distance in the x and y-directions ($D_x$, $D_y$) are indicated. The row-shift distance ($\Delta$) is shown to be equal to $M*Dy/N$, where $D_y$ is the pitch distance between adjacent pillars. The row-shift distance in the example of FIG. 1A is therefore $1/10*D_y$. The row-shift distance in the example of FIG. 1B is $2/5*D_y$. The pillar diameter ($D_0$) or radius $R_0$ and the pitch distance ($D_y$) in a gap direction also change the trajectory of emerged particles.

The pillar diameter ($D_0$) may be greater than or equal to about 50 nm. For example, the pitch diameter ($D_0$) may be 80 nm. The pitch distance ($D_y$) may be greater than or equal to about 100 nm. For example, the pitch distance ($D_y$) may be about 200 nm. The ratio $D_x/D_y$ may be 1/1, may be in the range of from about 1/1 to about 1/10, the ratio may be in the range of from about 1/1 to about 1/20, or the ratio may have other values, for example.

Particle trajectories may be calculated based on the geometries of the pillars 102 in a pillar array. FIG. 3A, FIG. 3B, and FIG. 3C show calculated particle paths for three different particles having three different radii through pillars 102, with respect to the 0 axis through the pillars. The pillars 102 in this example have periodicity of 5/2=2.5, the $D_x$ pitch distance is 400 nm and the $D_y$ pitch distance is 400 nm. The gap size G is 200 nm. The particle in FIG. 3A has a radius of 140 nm, the particle in FIG. 3B has a radius of 80 nm, and the particle in FIG. 3C has a radius of 125 nm.

The 140 nm radius particle in FIG. 3A, which is the largest particle, shows the greatest deflection along points 1-11 compared to the particles in FIGS. 3B and 3C, with respect to the 0 axis through the pillar array 102 and with respect to the direction of the fluid flow through the pillar array. The deflection is in a positive direction. In FIG. 3A, the larger particle bumps into and is deflected by the pillars 102. The 85 nm radius particle, which is the smallest particle, shows the smallest positive deflection in FIG. 3B with respect to the axis 0, where the particle generally follows the fluid flow along points 1-14 in a zigzag mode. The particle has a small positive angle of deflection or no deflection with respect to the direction of fluid flow and the axis 0. The 140 nm particle and the 85 nm particle can be separated due to the different deflections.

FIG. 3C shows that the trajectory of a particle having a radius of 125 nm is deflected in a negative direction along the points 1-14, with respect to the axis 0 of the pillars 102. This mode is referred to as a negative angle mode or B-mode. Depending on M and N, there may also be a positive or B+mode, which appears and disappears. The B-mode, in contrast, exists in most cases. Since the deflection of the 125 nm particle is in a different direction than the deflection of the 140 nm particle and the 85 nm particle, the B-mode enables separation of the 125 nm particle from the other two particles in a separation device including a negative angle DLD array 100.

Based on the variables N, M, and the $D_x/D_y$ ratio, a map may be generated showing the relationship between the particle size and corresponding migration angle. FIG. 4 shows such a map where N=11 and M=2 case, for three conditions: A) D200 ($D_x$=200 nm, $D_y$=200 nm), $D_x/D_y$=1.0, B) D200 ($D_x$=300 nm, $D_y$=200 nm) ($D_x/D_y$=1.5, and C) D22 ($D_x$=400 nm, $D_y$=200 nm) $D_x/D_y$=2.0. Particle size is expressed as Dp/Gap. The Gap distance is 200 nm and the radius of the pillars is 200 nm.

When $D_x/D_y$=2 case (line C) particles in a size range up to about 0.35*G migrate through the pillar array with a slightly positive angle with respect to the direction of the fluid flow in the zigzag mode. Particles in a size range of about 0.35*G to 0.5*G migrate through the pillar array at a slightly negative angle of −1 degrees in the B-mode with respect to the direction of fluid flow. Particles in a size range greater than 0.5*G migrate through the pillar array in the bump mode along an angle of 10 degrees with respect to the direction of fluid flow. A negative angle DLD array 100 with these parameters behaves as a bandpass filter enabling collection of particles with a radius in a range of from 0.35*G to 0.5*G in the B-mode, particles having a radius in a range up to about 0.35 may be collected in the zigzag mode, and particles having a radius in a range greater than 0.5*G migrate may be collected in the bump mode. It is noted that due to diffusion, not all particles in each range may be collected.

When the ratio $D_x/D_y$ is less than 2, the negative angle B-mode appears with a narrow band of the particle size. Where $D_x/D_y$=1.5 (line B), the distribution is similar to that of line C, with the B-mode extending from about 0.40*G to about 0.50*G. Particles in this range may be selected but since the range is narrow, there may be contamination by other particle sizes in this mode.

Where $D_x/D_y$=1.0 (line A), the angle of deflection of a particle having a radius of 0.4*G decreases but is not negative. Particles in this range may be collected but since the change in migration angle is small, there may be contamination by other particle sizes.

The widths of the particle size windows and the corresponding migration angles are different for different geometries. FIG. 5A shows the particle size windows for a negative angle DLD pillar array where $D_x/D_y$=1, N=5, and M=2. A zigzag mode appears in a range up to 0.50*G. A wider B-mode appears for particles having a size of from about 0.575*G to about 0.85*G. A bump mode is shown for particle sizes greater than about 0.85*G. Particles in these size ranges may be selected via these modes. A narrow B+mode also appears at 0.50*G.

FIG. 5B shows the results for a negative angle DLD array 100 where N=8 and M=3. A wider B+mode appears from about 0.35*G to about 0.60*G, FIG. 5A, and a B-mode extends from about 0.625*G to about 0.80*G, enabling particles to be selected in both ranges. Particles in a size range up to about 0.35*G may be selected a zigzag mode and particles in a size range greater than about 0.80*G may be selected in a bump mode.

FIG. 6 is a top view of an example of a microfluidic device 200 for particle separation, in accordance with an embodiment of the disclosure. The multistage DLD device 200 generally includes a fluid channel 202 formed on a substrate 204 that includes, in series, a first module 206, a second module 208, and a third module 210 along a length of the fluid channel. The fluid channel 202 includes a first sidewall 212 spaced apart at an equal distance along the channel length from a second sidewall 214 that spans at least the length of the first, second, and third modules.

The first module 204 includes a condenser 216, which focuses a particle stream. The second module 204 includes a negative angle DLD array 100, as discussed above, to separate a mixture of particles of different sizes into three ranges.

In operation, a fluid 222 (indicated by an arrow), including a mixture of particles sizes, is introduced into an entry port 224 of the condenser 216 in the first module 206. The condenser 216 focuses the fluid 222 toward a center of a bottom 228 of the condenser, where the fluid exits the condenser via an exit port 228. The fluid 222 enters the DLD array 100 via an entrance port via an entry port 230.

A portion of the condenser 216 is shown in more detail in FIG. 7. The condenser 216 may include condenser portions 232, 234 that comprise a plurality of pillars 250 between the sidewalls 212, 214, with a center focus. The pillars 250 within the array 250 are axisymmetrically arranged along a portion of the channel length such that a bisection of the channel length, as indicated by dotted line 238, provides a mirror image of one half of the array of pillars 236 relative to the other half array of the array of pillars 236. Each condenser portion 232, 234 includes multiple rows of pillars 236 that are laterally shifted relative to one another at a set distance. Relative to the flow direction of the fluid 222, the left condenser portion 232 is configured to shift all particles to the right, as indicated by arrow 239 and the right condenser portion 234 is configured to shift particles to the left, as indicated by arrow 241. Particles of different sizes in the fluid 222 are thereby focused toward the center of the bottom 226 of the condenser 216.

Returning to FIG. 6 and FIG. 1, the negative angle DLD array 100 includes pillars 102 configured to separate the particles in the fluid 222 into a first range 240 of smaller particle sizes, a second range 242 of larger particle sizes, and third range 244 of particle sizes between the first and second ranges. As discussed above, pillars 102 of the negative angle DLD array 100 may be configured to cause the smaller particles to separate into the first range 240 by the zigzag mode, to cause the larger particles to separate into the second range 242 by the bump mode, and to cause the particles between first and second ranges to separate into the third range via the negative angle mode. It is noted that FIG. 6 is not to scale.

The particles in the first range, the second range, and the third range exit the negative angle DLD array 100 through an exit port 246. The third module 210 includes a first partition wall 248 and a second partition wall 250. A first separation bin 252 is defined between the first partition wall 248 and the side wall 214, to collect particles in the third range 244. A second separation bin 254 is defined between the first partition wall 248 and the second partition wall 250 to collect particles in the first range 240. A third separation bin is defined between the second partition wall and the sidewall 216 to collect particles in the second range 256. The particle radii may range from about 20 nm to about 500 nm, for example. Fluid may pass through the microfluidic device 200 and other microfluidic devices described herein in a continuous stream at a high velocity. The velocity may be from about 300 um/s or faster, for example.

The microfluidic device 200 was tested and the results are shown in FIGS. 8A-10B. FIG. 8A shows the fluorescence microscopy image of 50 nm radius particles entering the negative DLD array from the condenser at Y=50 and migrating toward the bottom of the image as it moves through the negative angle DLD array 100. The units of the X and Y axes is pixels, which can be converted to micrometers with a conversion factor of 0.16 um/pixel. The fluorescence image in FIG. 8A shows a small shift of the 50 nm particles to the right in the zigzag mode, with respect to the direction of fluid flow through the negative angle DLD array 100. It is noted that the light intensity increases at about 240 pixels, which may be due to the velocity of the fluid decreasing in the negative angle DLD array 100.

FIG. 8B shows intensity line profiles plotted at different locations along the streamlines in FIG. 8A. The peak positions in each line profile show the small shift toward the right. As the light intensity is measured from left to right along the X-axis, the intensity increases in the locations where the concentration of the particle beam is higher. The brightest point in FIG. 8A may be mapped to the brightest point in FIG. 8B. By measuring this intensity profile along the Y-axis from top to bottom, the peak position shift toward the right is shown. The migration angle of the particles may then be calculated from the shift of the peak position. In FIG. 8B, the peak position changes slightly, corresponding to the change in FIG. 8A.

In FIG. 9A, the fluorescence image shows deflection of the beam of particles having a radius of 75 nm toward the left. As in FIG. 8A, the units of the X and Y axes is pixels, which can be converted to micrometers with a conversion factor of 0.16 um/pixel. The peak position in line profiles also confirms the shift is in the opposite direction to the case of the 50 nm particle, in FIG. 9B.

FIG. 10A shows the beam trajectory of particles having a particle radius of 110 nm in the bump mode. The migration angle is about 5 degrees. The deflection of the particles starting at Y=50, where the particles enter the DLD array, is most apparent in FIG. 10A. The peak position in line profiles is also shown shifted to the right in FIG. 10B.

FIG. 11 is a top view of another example of a microfluidic device 300 for particle separation, in accordance with an embodiment of the disclosure. As in FIG. 10, the microfluidic DLD device 300 includes a first fluid channel 302 formed on a substrate 304 that also includes, in series, a first module 206, a second module 208, and a third module 210 along a length of the first fluid channel. The fluid channel 302 includes a first sidewall 305 spaced from a second sidewall 307 that spans at least the length of the first, second, and third modules. FIG. 11 is not to scale.

In this embodiment, the first module 206, which focuses the particle stream 222, includes a hydrodynamic focusing chamber 306, where adjacent, high speed fluid flow streams are used to focus the particle stream 322 without diluting the fluid stream itself, as is known in the art. The hydrodynamic focusing chamber 306 includes a second fluid channel 308 on one side of the first fluid channel 302 and third fluid channel 310 on another side of the first fluid channel. The first fluid channel 302 is for the entry of a particle stream 312 comprising particles having a plurality of particle sizes. The second fluid channel 316 and the third fluid channel 318 are for providing high speed fluid for focusing the particle stream 312 toward a center of the bottom 314 of the hydrodynamic focusing chamber 306. As is known in the art, providing high speed fluid at the boundaries of slower moving fluid stream focuses the slower moving fluid stream into a narrow stream. The beam is focused toward an exit port of the hydrodynamic focusing changer 306, fore entry into the negative angle DLD array 100 through and entry port. Outlets 316, 318 are provided for the exit of the high stream fluids from the first module 206.

The second module 208 includes the negative angle DLD array 100 discussed above with respect to FIGS. 1-6 to separate the particles in the particle stream 222. The third module 210 is a separation chamber as in the embodiment of FIG. 6, to collect the separated particles.

In accordance with an embodiment of the disclosure, a system may be configured to only collect band-pass filtered particles as a binary sorter. FIG. 12 shows a microfluidic device 350 that is like the microfluidic device shown in FIG. 6 except that the condenser 216 is configured to focus the fluid stream 222 to the right, toward the first sidewall 212 of the fluid channel 202. In addition, only collection bins 252 and 254 are provided in the third module 210.

In one example, the condenser 216 is configured to focus the fluid stream 222 to the right, toward the first sidewall 212, by arranging all the pillars 236 so that each row is shifted toward the right with respect to the prior row. All the rows of pillars 236 may be configured as the rows of pillars are configured in the condenser portion 232 of FIG. 7, for example.

After pushing all particles to the right, the particle stream 222 exits the condenser 216 through the exit port 228, which is displaced toward the first sidewall 212. The particle stream 222 enters the negative angle DLD array 100 through the entrance port 230, which is also displaced toward the first sidewall 212. Particles in the second particle size range 242, which are deflected in the bump mode, impact the sidewall 212, where they follow the sidewall into the collection bin 254. Particles in the first particle size range 240, which are deflected in the zigzag mode, are also collected in the collection bin 254. Particles in the third particle size range 244, which are deflected in the negative angle, are collected by the collection bin 252. Since the particles in the third size range, which is between the first size range and the second size range, are selectively shifted in the opposite direction to the path of the other particles by the negative angle DLD 100 and the particles in the second size range 242 are not collected, collection of the particles in the third particle size range 244 is facilitated. Since the collection bin 252 may be larger than if all the particle ranges are collected, target sample loss of the particles in the third particle size range 244 can be decreased.

Collection of particles in the third particle size range 244 can be further improved by adding one more additional condensers downstream of the negative angle DLD 100, as shown in FIG. 13, which is not to scale. In this example, a condenser 258 that focuses the particles exiting the negative angle DLD array 100 leftward, toward the second sidewall 214, is also provided. The condenser 258 may have the configuration of the condenser portion 234 in FIG. 7, where rows of pillars 236 are shifted to the left with respect to a prior row. Contamination between different size particles can thereby be further decreased.

The negative angle DLD array microfluidic devices described above may be fabricated from microfabrication techniques, such as techniques conventionally used for silicon-based integrated circuit fabrication, embossing, casting, injection molding, for example. Suitable fabrication techniques include photolithography, electron beam lithography, imprint lithography, reactive ion etching, wet etch, laser ablation, embossing, casting, injection molding, and other techniques, for example. The negative angle DLD array microfluidic devices can be fabricated from materials that are compatible with the conditions present in the particular application of interest. Such conditions include pH, temperature, application of organic solvents, ionic strength, pressure, application of electric fields, surface charge, sticking properties, surface treatment, surface functionalization, and biocompatibility, for example. The materials of the device are also chosen for their optical properties, mechanical properties, and for their inertness to components of the application to be carried out in the device. Such materials include polydimethylsiloxane (PDMS), glass, fused silica, silicone rubber, silicon, ceramics, and polymeric substrates, such as plastics, depending on the intended application, for example. Devices can be coated with a fluorosilicate vapor and sealed by glass coverslips coated with polydimethylsiloxane (PDMS) on the sealing surface. The negative angle DLD array microfluidic devices can be placed into a plexiglass chuck for loading and application of pressures.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein, that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A microfluidic device comprising:
    a channel within a substrate;
    a condenser along the channel, the condenser configured to focus a fluid comprising particles of a plurality of sizes; and
    a negative angle deterministic lateral displacement (DLD) array configured to receive the focused fluid and separate the particles in the focused fluid into at least three sizes ranges, the DLD array comprising:
    a plurality of rows of pillars, wherein:
        the rows of pillars are positioned to repeat a pattern every N rows with a shift of M columns;
        N and M are relatively coprime; and
        N and is greater than 1.

2. The microfluidic device of claim 1, further comprising: collection bins to collect at least two of the three ranges of particles.

3. The microfluidic device of claim 1, wherein the particles in the fluid have radii of from about 20 nm to about 500 nm.

4. The microfluidic device of claim 1, wherein the negative angle DLD array is configured to:
deflect a first size range of particles in a bump mode, along a first positive angle with respect to an axis through the negative angle DLD array;
deflect a second size range of particles in a zigzag mode, in a second positive angle along the axis, wherein the second positive angle is smaller than the first positive angle; and
deflect a third size range of particles in a negative angle mode, along a negative angle with respect to the axis;
the first size range comprising particles having a size larger than a size of the particles in the second size range, and
the third size range of particles having a size between the size of the first size range of particles and the second size range of particles.

5. The microfluidic device of claim 4, further comprising:
a first collection bin configured to collect particles in the first size range;
a second collection bin configured to collect particles in the second size range; and
a third collection bin configured to collect particles in the third size range.

6. The microfluidic device of claim 5, wherein:
the exit port is proximate a sidewall of the condenser; and
the condenser is configured to focus the fluid comprising particles of a plurality of sizes toward the exit port so that the first size range of particles are deflected toward a first sidewall of the negative angle DLD array; and
the microfluidic device further comprises a first collection bin configured to collect particles in the third size range and a second collection bin to collect particles in the first size range and in the second size range.

7. The microfluidic device of claim 5, further comprising:
a second condenser downstream of the negative angle DLD array, the second condenser configured to focus the third size range of particles toward a second sidewall opposite the first sidewall.

8. A microfluidic device comprising:
a channel within a substrate;
a hydrodynamic focusing chamber along the channel, the hydrodynamic focusing chamber comprising:
a first entry port, a second entry port, and a third entry port, wherein the first entry port is configured to receive fluid containing particles of a plurality of sizes, and the second entry port and the third entry port are each configured to receive fluid at a higher speed than the fluid containing particles, to focus the fluid containing particles; and
a negative angle deterministic lateral displacement (DLD) array configured to receive the focused fluid and separate the particles in the focused fluid into three ranges, the DLD array comprising:
a plurality of rows of pillars, wherein:
the rows of pillars are positioned to repeat a pattern every N rows with a shift of M columns;
N and M are relatively coprime; and
N is greater than 1.

9. The microfluidic device of claim 8, further comprising:
collection bins to collect at least two of the three ranges of particles.

10. The microfluidic device of claim 8, wherein the particles in the fluid have radii of from about 20 nm to about 500 nm.

11. The microfluidic device of claim 8, wherein the negative angle DLD array is configured to:
deflect a first size range of particles in a bump mode, along a first positive angle with respect to an axis through the negative angle DLD array;
deflect a second size range of particles in a zigzag mode, in a second positive angle along the axis, wherein the second positive angle is smaller than the first positive angle; and
deflect a third size range of particles in a negative angle mode, along a negative angle with respect to the axis;
the first size range comprising particles having a size larger than a size of the particles in the second size range, and
the third size range of particles having a size between the size of the first size range of particles and the second size range of particles.

12. The microfluidic device of claim 11, further comprising:
a first collection bin configured to collect particles in the first size range;
a second collection bin configured to collect particles in the second size range; and
a third collection bin configured to collect particles in the third size range.

13. A method of separating particles in a fluid by a negative angle DLD array comprising a plurality of pillars positioned to repeat a pattern every N rows with a shift of M columns, where N and M are relatively coprime and N is greater than 1, the method comprising:
focusing fluid containing particles of a plurality of sizes toward a negative angle deterministic lateral displacement (DLD) array; and
separating the particles in the focused fluid into at least a first size range, a second size range, and a third size range by the negative angle DLD array.

14. The method of claim 13, wherein the third size range is between the first size range and the second size range, the method comprising deflecting particles in the second size range at a negative angle with respect to particles in the first size range and the third size range.

15. The method of claim 14 further comprising:
collecting the particles in the second size range.

16. The method of claim 15 further comprising:
collecting the particles in the first size range; and
collecting the particles in the third size range.

17. The method of claim 13, further comprising focusing the fluid toward a side of negative angel DLD array.

18. The method of claim 17, further comprising focusing the fluid toward the side of the negative angle DLD array by a condenser.

19. The method of claim 13, further comprising focusing the fluid by a condenser.

20. The method of claim 13, further comprising focusing the fluid by hydrodynamic focusing.

* * * * *